May 12, 1925.                                        1,537,205
L. TSCHÖRNER ET AL
FACSIMILE TELEGRAPH
Filed Oct. 30, 1920          2 Sheets-Sheet 1
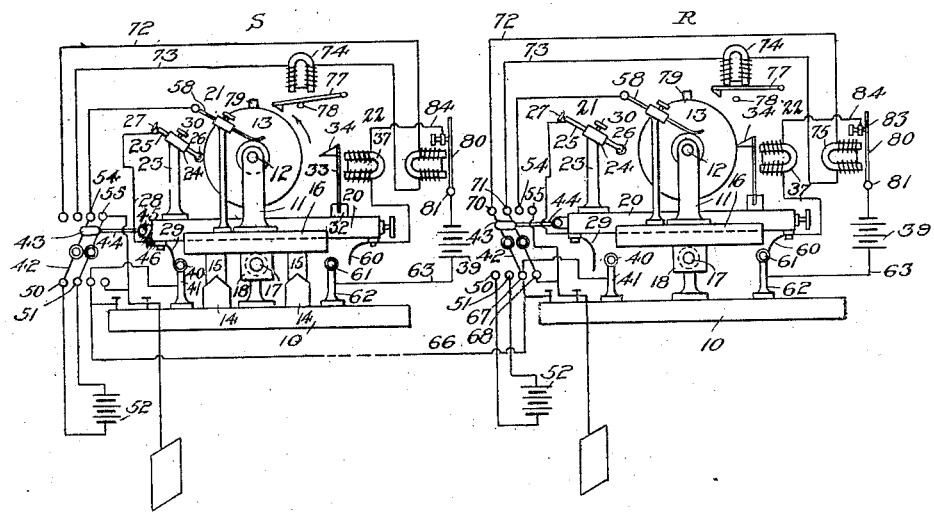
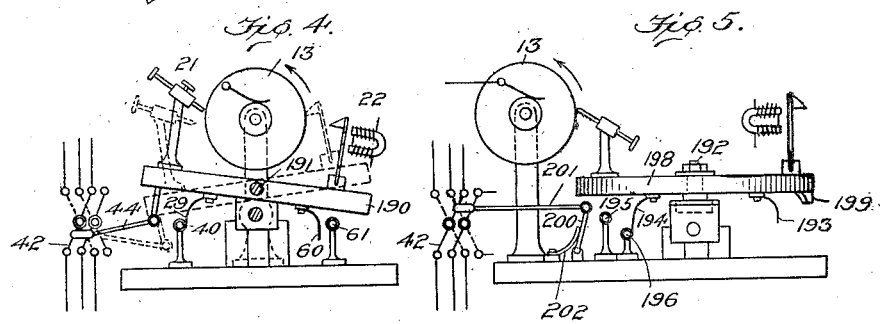
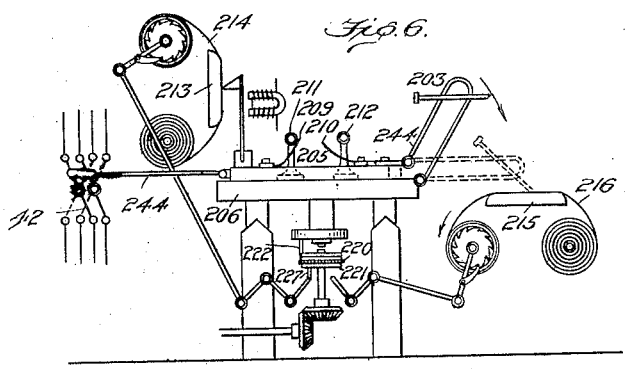
Inventors
Ludwig Tschörner
Nicholas Sandor
By Church & Church Attorneys May 12, 1925.

L. TSCHORNER ET AL

FACSIMILE TELEGRAPH

Filed Oct. 30, 1920     2 Sheets-Sheet 2

Inventor

Ludwig Tschörner
Nicholas Sandor

By Church & Church

Attorney

Patented May 12, 1925.

1,537,205

UNITED STATES PATENT OFFICE.

LUDWIG TSCHÖRNER, OF VIENNA, AUSTRIA AND NICHOLAS SANDOR, OF DRESDEN, GERMANY.

FACSIMILE TELEGRAPH.

Application filed October 30, 1920. Serial No. 420,679.

*To all whom it may concern:*

Be it known that we, LUDWIG TSCHÖRNER, a citizen of the Republic of Austria, residing in the city of Vienna, Austria, and NICHOLAS SANDOR, a citizen of the Republic of Hungary, residing at Dresden, Saxony, Germany, have invented certain new and useful Improvements in Facsimile Telegraphs; and we do hereby declare the following to be a full, clear, and exact description of the same, reference being had to the accompanying drawings forming part of this specification.

This invention relates to devices for the telegraphic transmission of pictures, drawings, signatures, etc., and to the art generally known as facsimile telegraphy. The primary object of the present invention is to provide a simple and improved mechanism for use either as a sending instrument or as a receiving instrument at will. Further objects of the invention will be apparent from the following description which include specific details, such as the means for synchronizing the speed of the cylinders of the two instruments of a circuit, the provision of a slide having a receiving instrument at one end and a sending instrument at the other end and so arranged that movement of the slide will bring either of the instruments into contact with the cylinder, and at the same time connected links will automatically shift a four pole switch so that the appropriate current for the instrument brought in contact with the cylinder will be connected, etc.

Instruments for the telegraphic transmission of drawings, etc., are well known and old, but many difficulties have been encountered in the use of these devices and it has been difficult to provide a satisfactory instrument that is simple in operation and yet capable of being utilized as either a sending or receiving instrument. This purpose is accomplished in the present device by mounting on each instrument a slide adapted to move transversely of the axis of the rotating cylinder carrying either the picture to be sent or the blank sheet on which the received picture is to be delineated, and mounting on such slide on one side of the axis a sending instrument and on the opposite side of the cylinder a receiving instrument, allowing sufficient space between the instruments so that either of them may be brought into contact with the roll or both thrown out of operation if desired. By connecting the double throw switch controlling the receiving and sending circuits to this slide automatic connection of the wires is made possible so that the mere shifting of the slide to one side or the other puts the device into condition for the selected use.

A very simple form of synchronizer is illustrated by means of which the faster moving cylinder is brought to a stop at each revolution and is released upon the passing of a definite point on the periphery of the sending instrument.

In the drawings,—

Figure 1 is a diagrammatic view showing two instruments in general side elevation and connected together so that one instrument is sending and the other instrument is receiving; both instruments being capable of use for either sending or receiving;

Fig. 2 is a similar view of a pair of instruments neither of which is adapted for both sending and receiving;

Fig. 3 is a plan view of the instruments shown in Figure 2;

Figs. 4, 5 and 6 are examples of modifications of the instruments shown in Figure 1;

Fig. 7 is a detail view of the inking device used on the receiving instrument.

In Figure 1 the sending instrument is denoted in general by the letter S and the receiving instrument by the letter R, these instruments however, being identical and are correspondingly numbered as far as possible, the connections however, being different in accordance with the uses of the two instruments. On the base 10 of the instruments is mounted a pair of posts 11 furnishing journals for the axis 12 of the cylinder 13 which is intended to support a picture or other matter drawn with non-conducting ink on a conducting surface which may be, for example, a light sheet of tin foil. It will be well understood by those skilled in the art that the device will work just as well with a non-conducting surface and with the picture drawn in conducting ink, but the first mentioned method is preferred, since in this case the contact roll which travels in a helical line over the entire surface will break the circuit upon touching a portion of the picture to be transmitted and it is easier to operate the receiving mechanism by a break in the current than it is by a make or contact.

The cylinder 13 may be driven by any desired motive power, a preferred form being a clockwork mechanism driving the sending instrument by positive connections and driving the receiving instrument by means of a pair of friction disks. None of these devices are illustrated in the drawings, except for the connections in Figure 3, since they are all well known and old and form no part of the present invention. A pair of guideways 14 are mounted upon the base 10 and support the grooved legs 15 of the slide carrier 16 which moves in a direction parallel to the axis of the cylinder 13, such movement being accomplished by any desired mechanism, as for example, by the screw spindle 17 mounted in bearings not shown and being threaded into a lug 18 depending centrally from the slide carrier 16.

The slide carrier 16 is grooved transversely to its direction of movement and receives a slide 20 upon which is mounted the sending instrument denoted as a whole by 21 and the receiving instrument denoted as a whole by the numeral 22. Sending instrument 21 consists of an insulating support 23 pivotally carrying a sleeve 24 which slidably receives a rod 25 having at one end a small roller contact 26 and at the other end a binding post 27 for connection with a wire 28 normally connected to an insulated spring 29 depending from the slide 20. The rod 25 is held in desired adjusted position on the sleeves 24 by means of a set screw 30 and is adapted to rest by gravity upon the surface of the cylinder 13.

The receiving instrument includes an insulating base 32 in which is pivoted a lever 33 carrying at its upper end a receiving device 34 preferably of an ink reservoir type. A small lug 35 is secured to the lever 33 and is adapted to limit the movement of the lever about its pivot when the receiving instrument is not in use, it being understood that the recorder 34 rests against the cylinder 13 when the instrument is being used for receiving, and records constantly except when the lever is drawn out of contact with the cylinder by the energizing of the polarized electromagnet 37 which is included in a local circuit containing a battery circuit 39.

By moving the slide 20 at right angles to the axis of the cylinder we are able to bring either the contact roller 26 or the recorder 34 into contact with the cylinder. In case the apparatus is used for sending as shown by S in Figure 1, the slide 20 is moved to the right bringing the roll 26 into contact with the conducting paper wrapped about the cylinder 13, and the spring 29 is brought into contact with a conducting rod 40 mounted on insulating posts 41 secured to the base 10. A double throw switch 42 is connected by means of a brace 43 and link 44 to a rod 45 mounted in lugs 46 on the slide 20, so that the same movement which brings the roller 26 into contact with the cylinder and the spring 29 into contact with rod 40 throws the switch 42 so as to connect points 50 and 51 leading to the line battery 52 with points 54 and 55 leading respectively to the spring 58 and to ground respectively.

Referring now to the connections shown with instrument R: The slide 20 is now thrown to the left bringing the recorder 34 into contact with the paper on cylinder 13, and a spring 60 similar to spring 29 is by the same movement thrown into contact with a conducting rod 61 carried by a support 62 secured to the base 10, the rod 61 running the length of the movement of the slide carrier 16 and being connected by means of the wire 63 to the local battery 39. This movement of the slide 20 shifts the switch 42 so as to disconnect the line battery 52 and to connect in its stead the line wire 66 by contact with point 67 and the ground connection by contact with point 68. The switch connects this line wire and ground to points 70 and 71 connected respectively to wires 72 and 73 forming a circuit which includes the synchronizing polarized electromagnet 74 and the recording polarized electromagnet 75, the former actuating an armature 77 normally resting against a stop 78 so as to contact with a radial arm 79 mounted on the axis of the cylinder 13. The energizing of the magnet 74 raises its armature 77 out of the path of the arm 79, thus permitting rotation of the cylinder. The magnet 75 controls an armature 80 pivoted at 81 and normally held by a spring away from a contact 83 which leads by means of the wire 84 to the magnet 37 and the spring contact 60. The energizing of the magnet 75 which occurs simultaneously with the energizing of the magnet 74 operates to energize the circuit including the local battery 39. It will be understood by those skilled in the art that while electromagnets 74 and 75 are shown separately for convenience of illustration in practice there will be but one magnet and the armature 77 or 80 will perform both functions, i. e., of controlling the local circuit and freeing the radial arm 79.

Any suitable synchronizing method may be carried out, one of which may be the following assuming that the matter to be sent is drawn with non-conducting ink on a conducting surface: In a groove suitably located on the cylinder 13 there can be provided a bar similar to the bar 130 embedded in the cylinder 120 of Figs. 2 and 3 but this bar is of non-conducting material since the ink of the matter to be sent is drawn with non-conducting ink. If the reverse arrangement were present relative to the picture to be sent then a conducting bar would be used. In sending the contact roller 26 is placed on the bar and the receiver instrument is set so that the armature 77 is against the stop 78 and therefore contacts with the radial arm 79. As soon as the roller contacts with the conducting surface of the picture to be sent which is immediately adjacent the bar a current will pass as from battery 52, contact 50, contact 54, brush 58, through the cylinder 13, roller 26, wire 28, contact 29, wire 66, contact 67, contact 70, wire 72, magnet 75, magnet 74 and then through the ground back to the battery. Thus the armature 77 will be raised and the cylinder will start to rotate. After the cylinder 13 of S has completed one revolution the roller will again pass on the bar and thus armature 77 will drop to thus stop cylinder 13 of R by means of arm 79 until the roller again contacts with the conducting surface. In practice it might be well to rotate cylinder 13 of R a trifle faster than cylinder 13 of S so that smooth operation may be attained which will however have no inaccurate effect on the facsimile produced.

In the devices illustrated in Figures 2 and 3 the sending instrument A is mounted upon a base 110 which carries at either end the journals 111, 112, 113 and 114 for the spindle 115 carrying the sending contact member 118 and the shaft 119 of the sending cylinder 120. These two shafts are driven by any desired motive power and are connected together by the gears 121 and 122. The sending member 118 includes a hub 123 threaded on the spindle 115 and having an integral arm 124 ending in a sleeve 125 which slidably receives a rod 126 having at its lower end a contact roller 127, the rod 126 being held in desired position by means of the set screw 128. A strip of metal 130 is embedded into the non-conducting surface of the cylinder 120, parallel to the axis of the cylinder and is connected by means of the wire 131 with a spring contact 132 and with the line wire 66, the latter extending from the sending instrument.

On an extension of the shaft 119 is mounted a synchronizing ring consisting of a plurality of disks adapted to contact at each revolution with five spring switches, two of which, 134 and 135 are connected with the battery 136, while the other three springs 137, 132, and 138 are connected respectively with the contact rod 126 by means of wire 140, the sending instrument by line wire 66, and ground by means of the wire 142. The disk 141 is entirely of conducting material with the exception of a short non-conducting strip 144 adapted to engage the spring 137 but not with the spring 134 which is invariably in circuit, with the ring where it makes contact being conducting throughout. The portion 145 of the other disk is likewise conducting throughout its entire circumference where it makes contact with the spring 135 connected to the battery, but is non-conducting where it engages spring 132, except for a small conducting strip 146 adapted to make contact with the spring 132, once with each revolution of the cylinder, and at such time as the conducting strip 130 is in contact with the roller. The outside portion of the disk is generally conducting, but has a non-conducting insertion 147 separated centrally by the conducting strip 148 in registry with the non-conducting portion 144 and the conducting portion 146. This conducting strip 148 is connected with the disk 141 so that when the metal rail 130 on the cylinder passes beneath the contact wheel 127, the battery current is reversed, the normal path of current being from the battery to spring 134, disk 141, spring 137, wire 140 to the roller 127, and back by way of ground to the wire 142, spring 138, disk 145 and spring 135, but when the contact 130 is under the wheel, the current passes from the battery 136 to the spring 134, disk 141, contact 148, spring 138, wire 142 to ground, through the receiving instrument and back by line wire 66, spring 132, conducting portion 146, disk 145 and spring 135 to battery 136.

The receiving instrument includes a cylinder 151 on an axle 152 mounted on bearings 153 and 154 and carrying at its outer end a bevel pinion 155 meshing with a gear 156 on shaft 157 receiving its power from the main drive shaft 158 by means of the bevel gears 159 and 160, the latter being mounted on the shaft 157. The shaft 152 also carries a friction wheel 161 which drives a similar wheel 162 on the spindle shaft 163 which moves the recording instrument denoted as a whole by the numeral 164. At its outer end the shaft 152 has secured to it a radial arm 165 adapted to strike against an armature 166 pivoted in lugs 167 and controlled by a polarized electromagnet 168 connected in series between the line wire 66 and ground, connected respectively through wires 169 and 170. The line wire 66 is also connected to ground by means of the wire 171 which energizes the electromagnet 172 of the recorder. These two polarized electromagnets are connected to the line and are actuated by the same direction of the current, an impulse in one direction increasing the strength of the magnets, while current in the opposite direction decreases the strength of these magnets.

Magnet 172 is mounted on the slide 173 of the receiver and is moved transversely by virtue of its threaded connection with the spindle 163 which is threaded so that the receiver slide will move in the direction of the arrow. This receiver slide carries a supporting post 174 adjustably carrying the inking device 175 and also carries a spring pressed lever arm 176 which is the armature of the polarized electromagnet 172, and is affected by it as follows: When there is current in the line the armature 176 is held by the magnet 172 in such manner as to withdraw the writing point 177 from the surface of the cylinder 151, but when the magnetic force in the magnet has been weakened, the spring is sufficiently strong to hold the writing point 177 against the cylinder 151 and to cause the drawing of a helical line. It will be readily understood that these conditions may be reversed if so desired, but the preferred manner is as stated.

The electromagnet 168 is used for synchronizing and withdraws the armature 166, once each revolution; this armature being the stop for the radial arm 165. Cylinder 151 revolves at a slightly faster speed than cylinder 120, but the armature 166 by blocking the passage of the radial arm 165 until the rail 130 comes into contact with the roll automatically keeps the two cylinders in perfect registry, since the armature 168 is not held in stopping position by a spring of sufficient strength to hold it away from the magnet 168 when the power of the latter has been increased by a flow of current in its coils, and the magnet is consequently intensified. When the current is reversed, the magnetism in the magnet 168 is decreased and the lever 166 comes into its original position by virtue of the power of the spring. During flow of current in the normal direction, the magnetism in both magnets is weakened, so that the writing pen 177 under the effect of its spring which works against the magnet attraction is held against the writing surface and continues to write as long as the current is closed and in that direction. During such time the magnet 168 is likewise weakened and the armature 166 is therefore uninfluenced.

When the cylinder 120 makes a complete revolution and the contact strip 130 engages the roll 127, cylinder 151 of the receiver which is running slightly faster, will be held back by its arm 165, which engages with the pivoted armature 166. The current, however, is now reversed and this intensifies the magnetism of the magets 168 and 172, having no effect on the latter but attracting the armature 166, thereby freeing the radial arm and allowing the cylinder 151 to continue its revolution.

When the record slide 173 reaches the end of the cylinder 151 it stops the clockwork automatically, since a right angled rod 178 attached to the slide engages a lever 179 pivoted at 180 and moves it into such position as to lie in the path of the pin 181 on the friction wheel 161 which will thus interrupt movement of the spindle 163 and cylinder 151. The short arm of the lever 179 is connected by a rod 182 with the armature 166 so that the first negative current impulse operates the lever 179 to free the pin 181 and to permit normal operation of the mechanism.

The writing pen is fed with ink from a reservoir 183 containing a wick leading to the writing point 177. The quantity of ink adapted to flow to the writing point is governed by the adjustable screw 184 which carries a needle point closing the hole 185. If desired a pointer 186 may be secured to the screw 184 in order to permit a very accurate adjustment of the flow of ink. This ink furnishing device has the great advantage that it does not take part in the movement of the pen and while the pen is moving alone, it is always fed by a fixed amount, thus insuring quick and clean work.

In the device shown in Figure 4 the apparatus is designed to replace the straight line movement of the slide of Figure 1, by a swinging movement. For this purpose the plate 190 rotates about an axis 191 by which movement either the recording device 21 or the reproducing device 22 may be brought alternately into contact with the cylinder 13. During such movement the sliding contacts 29 and 60 and the contact rails 40 and 61 establish the required current by means of the double throw switch 42 and the link 44.

Figure 5 illustrates a further modification where the base plate containing the sending and receiving instruments is rotatable about a vertical axis 192. In this case the cylinder 13 is not placed between the two devices, but is more conveniently arranged to one side thereof as shown. By turning the table a half revolution either of these devices may be brought into contact with the cylinder, at the same time establishing the correct circuit by means of the spring contacts 193 and 194 which are of different lengths so that the shorter contact 193 may come into contact with the top sliding rail 195 and the longer sliding contact 194 may touch the lower rail 196 alternately. In the first case the writing device is switched on with the appropriate current connections, while in the latter case the sending device is brought into circuit. The rotating table 198 is provided with a cam lug 199 adapted to actuate a lever 200 which is connected by means of a link 201 with the switch 42. When the cam is not in engagement with the lever a spring 202 returns the switch back into position to establish connection for the sending instrument.

Figure 6 shows a still further modification wherein the sending and receiving instruments move in a different way from that described in connection with the preferred form and the two modifications. In this latter case the sending and receiving instruments make alternate reciprocating movements back and forth over the surface of the sending and receiving tables, the latter supporting rolls of paper which advance intermittently. A slide 205 mounted on the carrier slide 206, carries both instruments facing in opposite directions, sending instrument 203 being connected to the slides 205 and 206 by means of a double arm 244 in such manner that when the slide 205 is moved to the right in the figure, the sending instrument comes into contact with the surface of the paper 216. On the slide 205 are located contact springs 209 and 210 adapted to make contact with the rails 211 and 212 respectively. Link 244, similar in all respects to link 44 of Figure 1, actuates the switch 42 in the usual manner. 213 is a vertical surface for supporting the receiving tape 214, and 215 is a horizontal surface on which the sending paper 216 is moved.

Under the slide 206 is mounted an endless band 220 which is actuated by means of a pulley 221, this endless band carrying a pin 222 connected to the slide 206 so that the latter is forced to move forward and backward with the movement of the belt so that the sending or receiving instrument whichever is used, will move on the surface of the paper from right to left and return.

The endless band 220 is also used to actuate the advance movement of the tapes 214 and 216. For this purpose the endless band is provided with a cam 227 for actuating the ratchet mechanism by means of which the tape is advanced slightly at each reciprocation of the instruments. The operation of this modification is believed to be apparent from the foregoing and the drawings.

We claim as our invention:—

1. A facsimile telegraph apparatus comprising a base; a cylinder rotatably mounted on said base; a slide carrier slidably mounted on said base and adapted to slide in a direction parallel with the axis of said cylinder; a slide member slidably mounted on said slide carrier and adapted to slide transversely to the direction of movement of the slide carrier; a sending instrument mounted on said slide member; and a receiving instrument mounted on said slide member, said instruments being mounted so that not more than one can be in operative relation with said cylinder.

2. In a facsimile telegraph, a rotatable cylinder, means for rotating said cylinder, a sending instrument and a receiving instrument, a base on which said receiving instrument and said sending instrument is mounted so movable as to bring either one of said instruments into contact with said cylinder when desired.

3. In a facsimile telegraph, means for holding a record, receiving means adapted to contact with said record, sending means adapted to contact with said record, electric circuits connected to said sending instrument, electric circuits connected to said receiving instrument, and means for alternately moving said sending instrument and said receiving instrument into and out of contact with said record with a consequent automatic connection of the appropriate circuit.

4. In a facsimile telegraph instrument, a rotating cylinder, a slide adapted to move parallel to the axis of said cylinder, a second slide mounted on said first mentioned slide and movable at right angles thereto, sending means on said slide, receiving means on said slide, and means controlled by said second mentioned slide for automatically connecting either of said instruments in circuit.

5. A facsimile telegraph apparatus comprising a base; a cylinder rotatably mounted on said base; a slide carrier slidably mounted on said base and adapted to slide in a direction parallel with the axis of said cylinder; a slide member slidably mounted on said slide carrier and adapted to slide transversely to the direction of movement of the slide carrier; a sending instrument mounted on said slide member; a receiving instrument mounted on said slide member, said instruments being mounted so that not more than one can be in operative relation with said cylinder; and a switch operated by the movement of the slide member for electrically controlling said instruments.

6. In a system for facsimile telegraphy comprising a sending instrument and a receiving instrument; a switch for each instrument; a relay associated with said receiving instrument; an electric circuit controlled by said switches for sending the electric impulses from the sending instrument to said relay of the receiving instrument; a second circuit for operating said receiving instrument controlled by said relay; and means for synchronizing said instruments controlled by said relay.

7. A facsimile telegraph apparatus comprising a base; a cylinder rotatably mounted on said base; a slide carrier slidably mounted on said base and adapted to slide in a direction parallel with the axis of said cylinder; a slide member slidably mounted on said slide carrier and adapted to slide transversely to the direction of movement of the slide carrier; a sending instrument mounted on said slide member; a receiving instrument mounted on said slide member, said instruments being mounted so that not more than one can be in operative relation with said cylinder; and means for moving said slide carrier.

8. A facsimile telegraph apparatus comprising a base; a cylinder rotatably mounted on said base; a slide carrier slidably mounted on said base and adapted to slide in a direction parallel with the axis of said cylinder; a slide member slidably mounted on said slide carrier and adapted to slide transversely to the direction of movement of the slide carrier; a sending instrument mounted on said slide member; a receiving instrument mounted on said slide member, said instruments being mounted so that not more than one can be in operative relation with said cylinder; a switch operated by the movement of the slide member for electrically controlling said instruments; and means for moving said slide carrier.

9. A facsimile telegraph apparatus comprising a base; means for holding a record rotatably mounted on said base; a sending instrument; a receiving instrument; means for simultaneously moving said instruments in order to bring one of said instruments into operative relation with said record; and a switch operated by said second-named means for electrically operating said instruments.

LUDWIG TSCHÖRNER.
NICHOLAS SANDOR